United States Patent [19]
Barra

[11] Patent Number: 5,934,013
[45] Date of Patent: Aug. 10, 1999

[54] AGRICULTURAL HEATING CONTROL METHOD

[76] Inventor: Florencio Lazo Barra, P.O. Box 780, Rancagua, Chile

[21] Appl. No.: 08/977,620

[22] Filed: Nov. 25, 1997

[30] Foreign Application Priority Data

Nov. 27, 1996 [CL] Chile ........................................ 2074-96

[51] Int. Cl.[6] .................................................. A01G 13/00
[52] U.S. Cl. ............................................ 47/2; 237/12.3 A
[58] Field of Search ................................ 237/12.3 R, 13, 237/50, 80; 47/2

[56] References Cited

U.S. PATENT DOCUMENTS 1,499,894  7/1924  Waterman .
3,210,059 10/1965  Nesbitt et al. .
4,513,529  4/1985  Reich ............................................. 47/2
4,838,761  6/1989  Sheppard .

FOREIGN PATENT DOCUMENTS 2240685  3/1975  France .

*Primary Examiner*—Henry Bennett
*Assistant Examiner*—Derek S. Boles
*Attorney, Agent, or Firm*—Evenson, McKeown, Edwards & Lenahan, PLLC

[57] ABSTRACT

A method to produce heating for use in agriculture uses a stream of hot air produced by a centrifugal ventilator fan. Heat exits or air vents are used to discharge the air. Mobility is provided by mounting the fan to an agricultural tractor.

6 Claims, 5 Drawing Sheets

AGRICULTURAL HEATING CONTROL METHOD

BACKGROUND OF THE INVENTION

1. Field of the Invention

Frosts are a mayor problem during spring time because this is the time when crops are more vulnerable.

There are two different types of frost: radiative frost, and advective freeze. The former is produced when the earth looses heat during clear nights. It is the inverse process to the earth heating during the day by solar radiation. In this case is the earth what irradiates heat to the atmosphere. The air is getting colder from the bottom to the top very slowly. Therefore lower air layers have less temperature than upper layers. Hence people talk about thermal inversion layer, which is placed at about ten meters (thirty feet) from the ground, and thirty meters thick. It is 5° C. hotter than the ground level temperature. Over this layer temperature decreases again. The latter, advective freeze, occurs when a mass of cold air, or polar air comes to the crop or orchard.

2. Description of Related Art

Mankind has looked for how to fight frost effects. The most common are the use of firewood, fuel heaters, wind mills or propellers, the use of helicopters flying over the orchards, etc.

The heaters are very effective to control frosts, but they have the inconvenient of their high operation cost, because of the great fuel consumption since they are very inefficient. They heat the air to very high temperatures, which goes up quickly causing the "chimney effect". Thus, we have no radiative effect to the surrounding air. Great fuel consumption is required and great contamination is produced as well.

The other systems are the helicopters and the propellers. They both blow hotter air from the inversion layer and then this hot air is mixed with the colder air from down below, closer to the ground.

Besides these systems, I know about a patented system in Uruguay, thought to protect citrus plantations. This system is also based on the idea of taking hotter air from the inversion layer, using a ten meters high or over funnel, that has a fan on its bottom part by which cold air passes through and makes hotter air to come down to crop or orchard.

I knew also about a grower from the El Olivar county who has used an axial fan belonging to a turbo atomizer to which he put a heater in order to blow hot air to his vineyards. He abandoned this idea due to the area under control was too little. I tried something similar about five years ago with no useful results.

I have the information also of the patent appliance No. 682-94, in which the use of a moving machine that blows hot air transported by a tractor is told. The grower talks about the drawings but they were never showed. He also tells about a fan in which one can modify the angle of attack of its blades. Therefore it is clear that it is an axial fan, similar to the one the grower from El Olivar used, and the one I used before in my first experiences as well.

With the development of new irrigation techniques, sprinklers are being used to wet the crop we want to protect. But the problem now is that in some cases is not convenient to wet the crop or the tree for potential fungal diseases or some times we might have no enough water at this time of the year (winter time).

I have searched in the CAB Abstracts system, at Universidad Católica, finding 147 articles under the command "frost protection". Only two of them mentioned something about an specific device to control frost. It was published in 1991, in "Tractory-i-Sel' skokhosyainestevennye-Mashiny" in the Russian republic of Georgia. It talks about a stationary machine, the YOP-2 and the YOP-2M which is movable.

The former is a machine placed on a tower, which blows hot air through a rotating tube of 1 meter diameter, covering a 200 meters radius area. This system has an advantage over the traditional fans or propellers, which are no effective in advective frosts (freeze). This movable machine goes over a cart and it produces fog that throws over the field. With this purpose it uses 90 to 100 MT of water per hectare.

These systems explained above are absolutely different from mine.

SUMMARY OF THE INVENTION

My method is totally new and totally different to those currently used. This method is that by the use of an appropriate machine we can insert a layer or bag of hot air in the cold air mass. This was achieved thanks to the use of an centrifugal fan, with two exits, with a heater, that travels across the field on a tractor, at an speed of about 10 Km per hour. The air is thrown or blown aerodynamically clean, it means with no turbulence, what lets it get a great distance, and form what we could call a hot air bag. This bag stays low, traveling by the crop or orchard in the same direction it was thrown by the fan, due to the inertia it has.

The air leaves the machine at 80° C. It mixes quickly with the cold air and thus, at approximately 2 meters it has already lowered its temperature to about 25° C. At 10 Mts. the temperature is never over 10° C. At this distance the horizontal speed that the air has is high so it keeps going in that direction, but it doesn't go any upper. As the speed decreases, the difference in temperature between this and the surrounding air also decreases. They have similar densities what makes the air continue going horizontally and at the same height.

Here is the main difference compared with the methods explained before, which their idea is nothing else than mix the supposed hotter air at the inversion layer with the colder air in contact with the crop. They are very efficient at mixing air since the air they blow is very turbulent. Those axial fans or propellers, like the patent appliance 682-904, and the grower from El Olivar don't have practical results, since the area they can control is too small, this because they mix the air and they cannot form that layer or bag of hot air that my method can do.

DESCRIPTION OF THE PREFERRED EMBODIMENT

Figure 1:
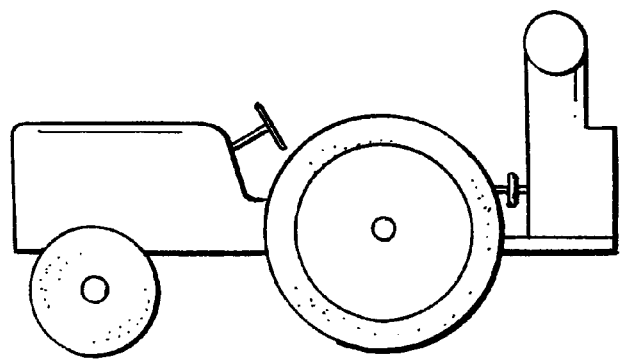
FIG. 1 is a side view of a fan and heater unit used in the invention and mounted on a platform or trailer attached to a tractor.
Figure 2:
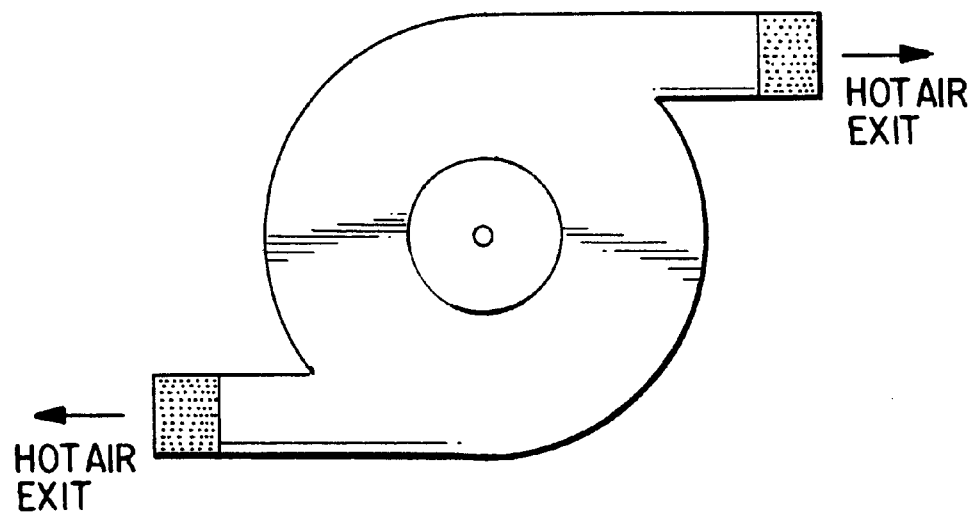
FIG. 2 is a rear view of the fan and heater unit of FIG. 1.
Figure 3:
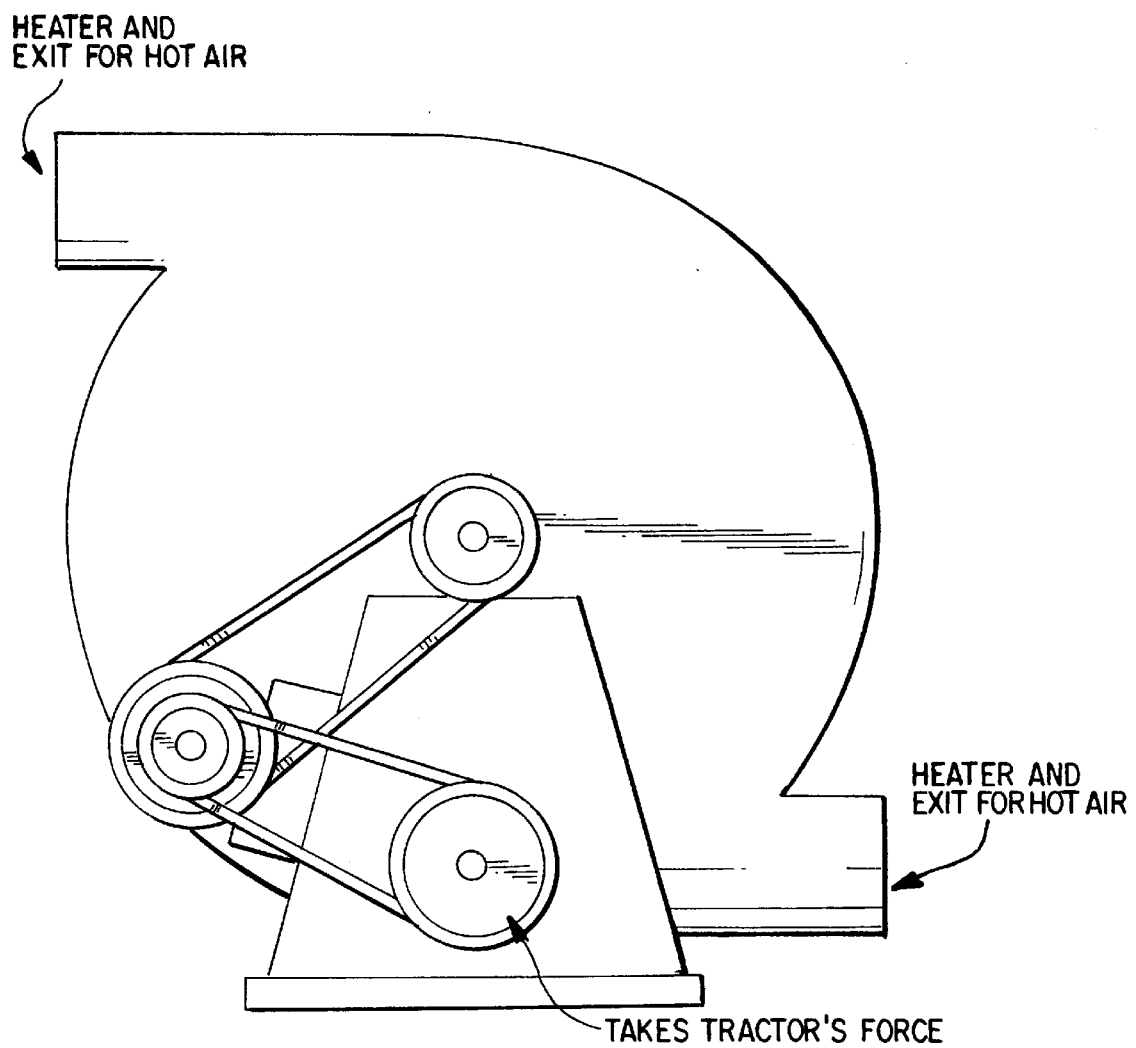
FIG. 3 is a view similar to FIG. 2 but showing a belt and pulley system by which rotational force is applied to the fan of the fan and heater unit.
Figure 4:
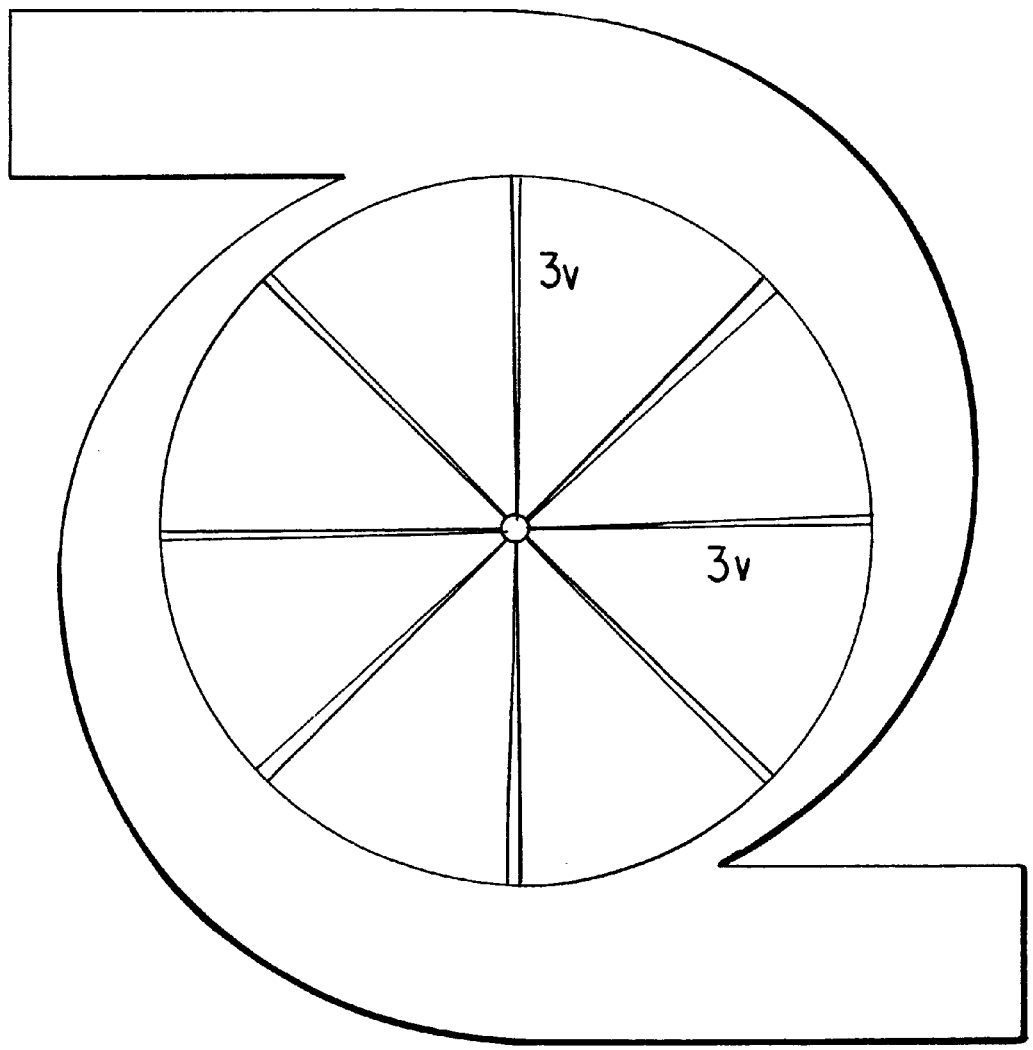
FIG. 4 is a sectional view showing fan blades of the fan and heater unit.
Figure 5:
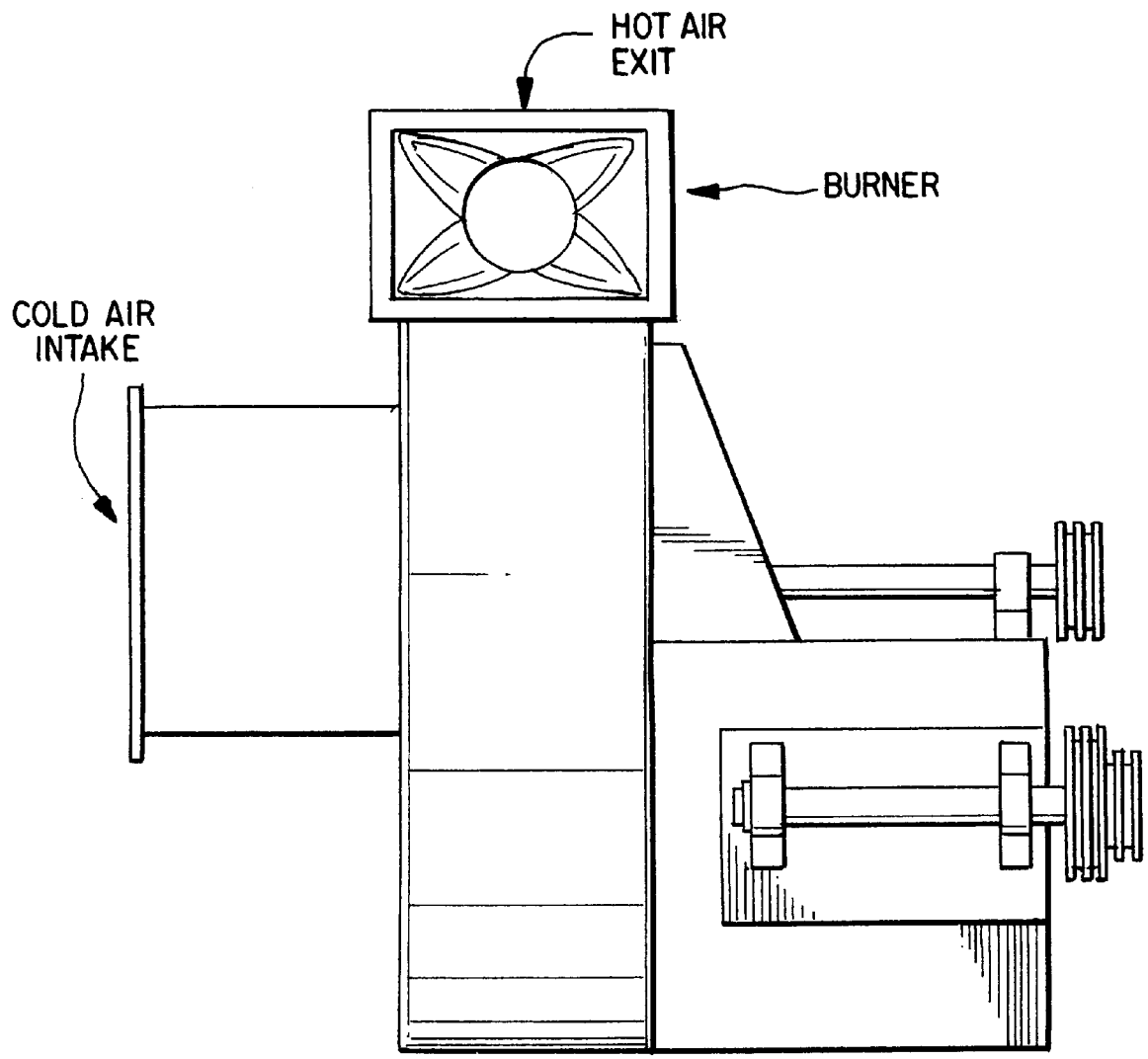
FIG. 5 is a side view of the fan and heater unit showing the cold air intake and the hot air exit.
Figure 6:
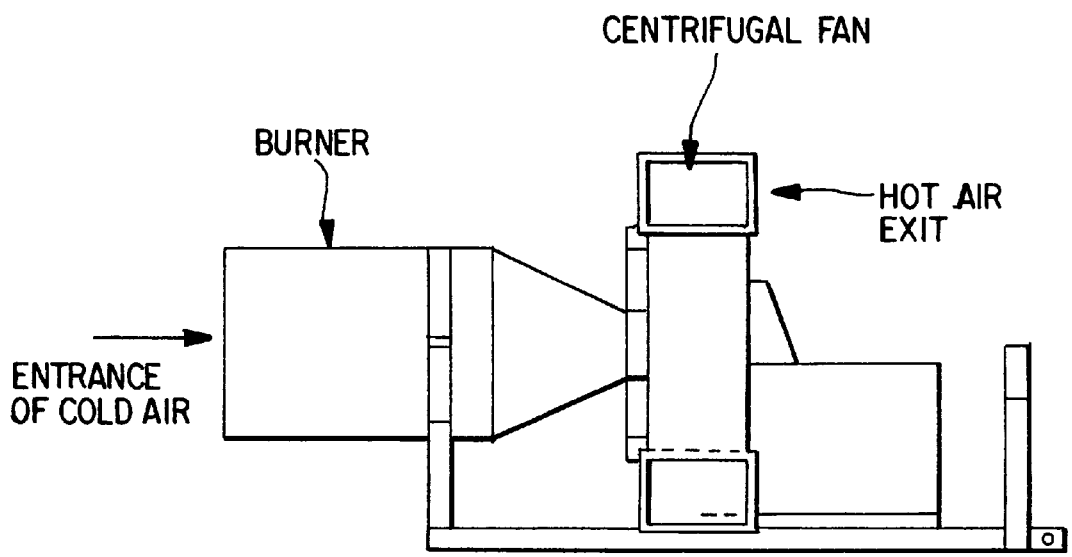
FIG. 6 is a side elevational view showing a slightly modified fan and heater unit construction.
Figure 7:
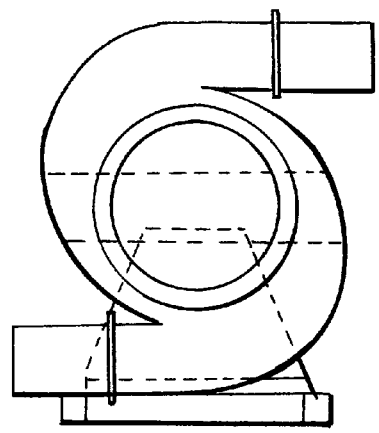
FIG. 7 is a rear view of the unit shown in FIG. 6.

For a better understanding of this method, we can say that it is possible to produce or create, in an artificial way, a low height thermal inversion layer, beneath the actual thermal inversion layer, or create one in advective freeze cases, since that layer doesn't exit.

I have carried out some experiences in my table grape vineyards and in my plum orchards in severe frost conditions with amazing results.

I used a 5 hectare vineyard block as field test, each one on table grapes. Every block is separate by a road in between, and they have also a lateral road by their side. The tractor carrying the machine traveled by the road that surrounded the central block, it means, it blew the air towards the central block and also towards the one at its north side and towards the one at its south side as well.

We obtained a constant pattern of results after the host of measurements we carried out. After every passed of the tractor with the machine the temperature rose 0.5° C., at a distance of 50 Mts., which began to loose temperature afterwards due to the normal radiation loss. Hence, the tractor has to pass over the same spot every ten minutes, time needed to loose the heat the machine gave and get to the temperature it had before (this is the same frequency that the helicopters need). The machine controls an area of 50 Mts. long to both sides, but as I said before, a sort of hot air bag is formed, which is pushed with a new turn of the tractor blowing hot air again. It keeps moving horizontally in the same direction it was thrown since the beginning. The amazing result is that we can produce a sort of microclimate inside the vineyard, which stays with temperatures from over 0.3° C. at the coldest part to 1.2° C. at the hottest part of the filed test area. The temperatures outside the area under treatment were at below −2.5° C.

The experiences carried out at the plum orchard got similar results. This is a 15 hectare orchard, variety Red Beaut, which was severely affected the last season with the September 6th frost. We estimated 30.000 boxes yield, and we just harvested 214 boxes. They are divided in two blocks, 7.5 hectare each, separated by a road in between. In this case our strategy was to pass the machine only by the central road. The hot air bag or hot layer effect was definitely confirmed, since after simultaneous turns of the tractor we could measure, using very sensitive digital thermometers, up to a distance of 120 Mts. to both sides of the central road. In the case of the point 120 Mts. far the temperature 0.3° C. which got to the same temperature they had before in about ten minutes. It was very easy to handle a temperature of the orchard over 0.5° C. while the temperature outside the test area was −1.9° C.

We have to emphasize that the tests have been done under radiative frost and also under advective freeze conditions, getting fairly similar results in either treatments.

The fuel used here is liquid gas. Which goes inside of four 40 kg cylinders each, what lets a working time of five hours, being more than enough to fight the most severe springtime frost.

As a way to improve the temperature control I switched the heaters from the exit of the blowing tube to the entrance of the cold air in the back part of the machine.

I claim:

1. A method for frost control in agriculture and fruit production comprising the steps of:

drawing cold air into a rearwardly directed cold air entrance of a machine including a centrifugal fan in a housing with two exits, heating said cold air with a liquid gas or petroleum heater, discharging hot air at about 80° C. in two layers and in opposite lateral directions through said two exits so that discharged air passes over a field and through said cold air without turbulence, and moving a tractor supporting the fan transversely to said opposite directions at about 10 Km per hour relative to the field.

2. A method for frost control in agriculture and fruit production according to claim 1, wherein said hot air is thrown in streams which are aerodynamically clean so as to penetrate the cold air and form a hotter air layer.

3. A method for frost control in agriculture and fruit production according to claim 1, wherein said hotter air layer is an artificial low thermal inversion layer, beneath a natural thermal inversion layer, so that when an advective freeze is present, said artificial low thermal inversion layer is created at a height of a fruiting zone.

4. A method for treating an agricultural area comprising the steps of:

drawing cold air into a rearwardly directed cold air entrance of a machine including a centrifugal fan in a housing with two exits, heating said cold air with a liquid gas or petroleum heater, discharging hot air at about 80° C. in two layers and in opposite lateral directions through said two exits so that discharged air passes over a field and through said cold air without turbulence, and moving a tractor supporting the fan transversely to said opposite directions at about 10 Km per hour relative to the field.

5. A method according to claim 4, wherein said hot air is thrown in streams which are aerodynamically clean so as to penetrate the cold air and form a hotter air layer.

6. A method according to claim 4, wherein said hotter air layer is an artificial low thermal inversion layer, beneath a natural thermal inversion layer, so that when an advective freeze is present, said artificial low thermal inversion layer is created at a height of a fruiting zone.

* * * * *